Oct. 1, 1935.   E. G. MAYER   2,015,950
PHOTOGRAPHIC CAMERA
Filed Aug. 17, 1933   3 Sheets-Sheet 1

Inventor,
Edwin G. Mayer.

Oct. 1, 1935.  E. G. MAYER  2,015,950
PHOTOGRAPHIC CAMERA
Filed Aug. 17, 1933   3 Sheets-Sheet 2
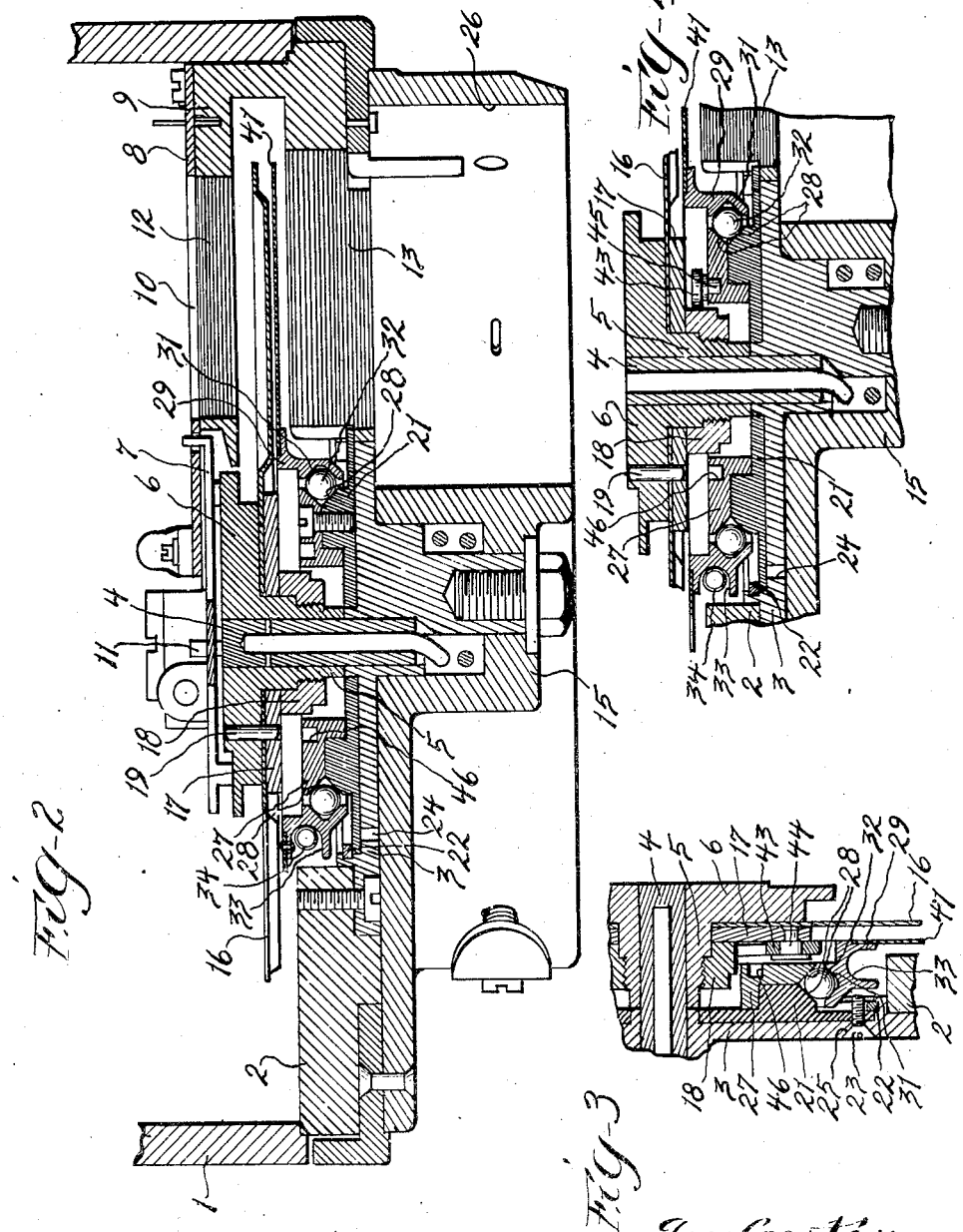
Inventor
Edwin G. Mayer.
By:- Robert F. Miehle, Atty.

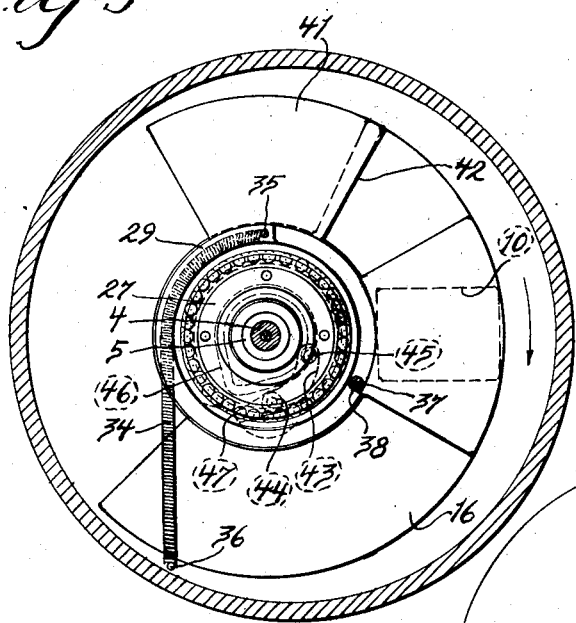
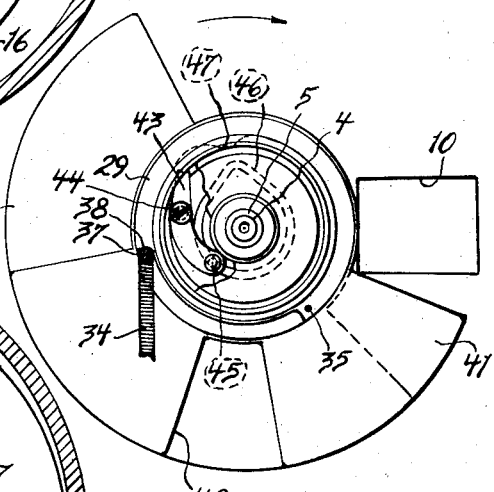
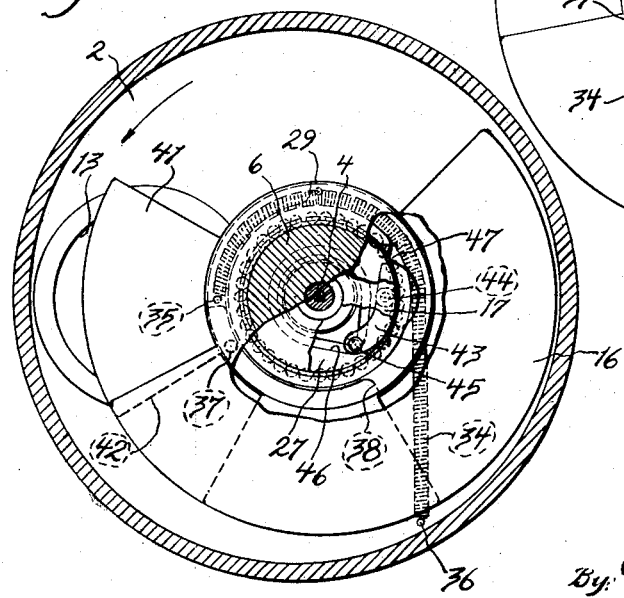

Patented Oct. 1, 1935

2,015,950

UNITED STATES PATENT OFFICE 2,015,950

PHOTOGRAPHIC CAMERA

Edwin G. Mayer, Chicago, Ill., assignor to The Bell & Howell Company, Chicago, Ill., a corporation of Illinois Application August 17, 1933, Serial No. 685,527

4 Claims. (Cl. 88—19.3)

My invention relates particularly to motion picture cameras, although not limited to this use alone.

In motion picture cameras it is universal practice to employ a rotating exposure shutter which is driven in timed relation with the intermittent film feeding mechanism of the camera, and as a result the exposure period of the shutter varies with the speed at which the shutter and intermittent film feeding mechanism is driven.

One of the objects of my invention resides in the provision of an exposure shutter device for motion picture cameras and the like which provides a uniform exposure period irrespective of the speed at which the mechanism is operated.

Another object of my invention resides in the provision with a rotating exposure shutter of means whereby a uniform exposure period is obtained irrespective of the speed of rotation of the rotating shutter, means being preferably provided whereby the mechanism may be set to provide an exposure period varying with the speed of rotation of the rotating shutter.

With these objects in view my invention consists in certain features of novelty in the construction, combination, and arrangement of parts by which the said objects and certain other objects, hereinafter appearing, are effected, all as fully described with reference to the accompanying drawings and more particularly pointed out in the appended claims.

In the said drawings—

Figure 2 is a partial section on the line 2—2 of Figure 1;

Figure 3 is a partial section on the line 3—3 of Figure 1;

Figure 4 is a partial section similar to Figure 2;

Figure 5 is an interior sectional view looking rearwardly;

Figure 6 is an interior sectional view looking forwardly; and

Figure 7 is a front elevation of certain of the parts of the mechanism.

Like characters of reference indicate like parts in the several views.

Figure 1:
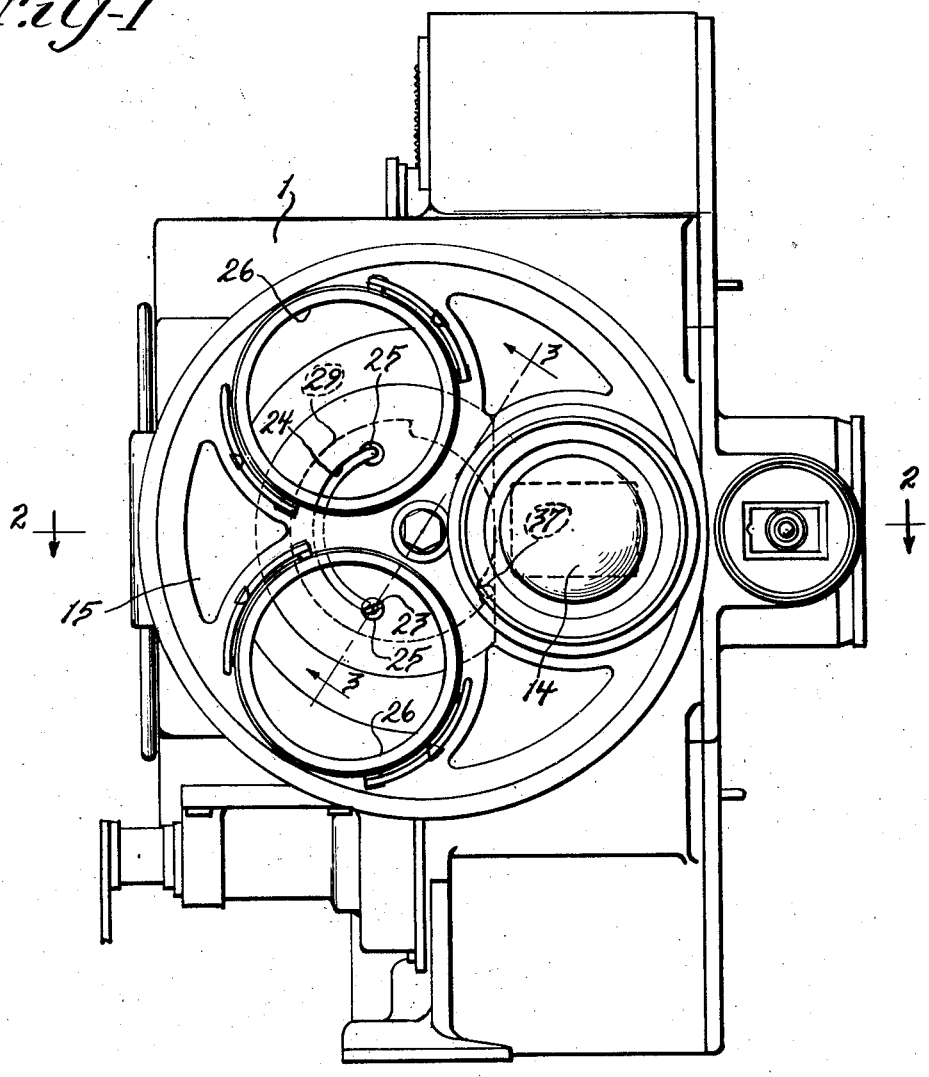
Figure 1 is a front elevation of a motion picture camera embodying my invention.

Referring to the drawings, I designates the main casing of the camera, and 2 designates the main portion of a circular front piece closing a circular front opening of the main casing. See Figures 1 and 2.

A member 3 is secured on the main portion 2 of the front piece and closes a central opening thereof, and mounted on the member 3 in substantially central relation therewith and projecting rearwardly therefrom, is a stud 4, and a bored member 5 is rotatably mounted on the stud 4 at the rear of the member 3. See Figures 2, 5 and 6.

The rear end of the member 5 is enlarged, as designated at 6, and comprises the rotating driving member of an intermittent film feeding mechanism, including a shuttle 7, which intermittently feeds a film, not shown, through an exposure guide at one side of the camera, this guide including a front film face guide plate 8 mounted on a rearwardly spaced extension 9 of the main portion 2 of the front piece and provided with an exposure aperture 10.

The intermittent film feeding mechanism is similar to that disclosed in U. S. Patent No. 1,620,726, granted March 15, 1927 on application of Albert S. Howell, for improvement in Motion picture camera and the like, and requires no further description herein. The member 4 is driven from its rear end by means of a crank stud 11, see Figure 2.

The extension 9 is provided with a light aperture 12 alined with the aperture 10 and the main portion of the front piece 2 is also provided with a light aperture 13, see Figure 2, through which the exposure light is projected from a photographic lens 14, see Figure 1, alined therewith and mounted on a turret structure, generally designated at 15, carried on the front of the front piece 2.

A revoluble segmental light shutter 16 is clamped between the forward face of the enlarged portion 6 of the revoluble member 5 and an annular member 17 by means of a nut 18 screw threaded on the revoluble member 5, and a pin 19, engaged in alined bores through the enlarged portion 6 of the member 5, the shutter 16 and annular member 17, angularly fixes these parts, see Figure 2, the shutter 16 being timed with the intermittent film feeding mechanism to expose the film at the exposure aperture 10 during the rest periods of the intermittent feed of the film as is usual.

An axially bored circular member 21 is engaged for pivotal movement, on the axis of the stud 4, in a circular recess in the rear surface of the member 3 and is retained therein by means of a split ring 22 engaged in an internal groove in the peripheral surface of said recess. See Figure 2.

The member 21 is secured in either of two positions of its pivotal movement by means of a headed screw 23 passing rearwardly through an angular slot 24 through the member 3 and screw-threaded into the member 21 and engaging one or the other of countersink formations 25, in the front face of the member 3, at the ends of the slot 24 to secure the member 21 at its two angular positions, hereinafter described, see Figures 1, 2 and 3, the slot 24 providing for the manual movement of the member 21 from the exterior of the camera through lens mount openings 26 of the turret structure 15 through which the screw 23 is also accessible.

An annular member 27 is secured on the rear face of the member 21 in coaxial relation therewith, and the members 21 and 27 are provided with tapered peripheral surfaces 28 facing each other and forming a V groove ball bearing race.

A ring 29 encircles the V groove portion of the members 21 and 27 and is provided with an internal V groove 31, and bearing balls 32 are engaged between the surfaces 28 and the groove 31, thereby supporting the ring for angular movement on the axis of the stud 4. See Figures 2 and 5.

The ring 29 is provided with an external groove 33, and a helical tension spring 34 has one end secured with the ring 29, as designated at 35, and engages in this groove and has its other end secured with the main portion 2 of the front piece, as designated at 36 in Figures 5 and 6, whereby to actuate the ring 29 in the direction opposite the direction of rotation of the segmental shutter 16 as indicated by the arrows in Figures 5, 6 and 7.

A stud 37 is mounted on the member 21 and, projecting rearwardly therefrom, lies in the path of a radial surface 38 on the ring 29 to provide a stop for the ring 29 in the direction in which the spring 34 actuates the ring. See Figures 5, 6 and 7.

Secured on the ring 29 is a second segmental light shutter 41 controlling the exposure at the aperture 19 and provided with an intermediate light opening 42. Actuation of the shutter 41 in timed relation with the intermittent film feeding mechanism and the shutter 16 is effected in the following manner.

A pawl 43 is intermediately pivoted, as designated at 44, on the front face of the annular member 17, see Figures 3, 5 and 6, and one end of this pawl is provided with a stud 45 which is engaged in a cam groove 46 formed in the rear face of the member 27 for controlling the pivotal movement of the pawl as the member 5 is rotated.

The other end of the pawl 43 is adapted for engagement with an internal lug on the ring 29 for operating the ring 29 and shutter 41 in the direction of rotation of the shutter 16 or in the direction opposite that in which the spring 34 actuates the shutter 41.

The arrangement is such that the cam groove 46 effects engagement of the pawl 43 with the lug 47 to actuate the shutter with the shutter 16 and then disengages the cam from the lug to permit the spring 34 to actuate the shutter 41 in the opposite direction.

Assuming the member 21 to be fixed in the position with the screw 23 at the lower end of the slot 24, the operation at the shutters 16 and 41 is as follows. See Figures 5 and 6.

The shutter 41 is positioned by the stud 37 opposing the spring 34 with the portion of this shutter, leading with reference to the direction of rotation of the shutter 16, covering the exposure aperture 19.

As the shutter 16, in its rotation, nears the end of its non-exposure period, as shown in Figure 5, and while it overlies the intermediate opening 42 of the shutter 41, the pawl 43 engages the lug 47 and actuates the shutter 41 with the shutter 16 from the position shown in Figure 5 to the position shown in Figure 6 in which the portion of the shutter 41, trailing with reference to the direction of rotation of the shutter, covers the exposure aperture 10 and in which the shutter 16 is in its exposure period.

With the shutters 16 and 41 so positioned, the pawl 43 is moved out of engagement with the lug 47, as shown in Figure 6, and the shutter 41, thus released is actuated in the opposite direction by the spring 34 until the radial surface 38 again engages the stud 37, as shown in Figure 5.

In this movement of the shutter 41 opposite the direction of rotation of the shutter 16, the intermediate opening 42 effects the exposure as it passes over the exposure aperture, this exposing movement of the shutter 41 being effected by the spring 34 and being thus uniform irrespective of the speed of the intermittent film feeding mechanism and the rotating shutter 16.

In order to render the uniform exposure shutter 41 ineffective to control the exposure, the member 21 is angularly shifted to engage the screw 23 in the upper countersink formation, and in this position the stud 37 engaging the radial surface 38 positions the shutter 41 beyond the exposure aperture 10 in the direction of rotation of the shutter 16, see Figure 7, so that while the shutter 41 is actuated as before, the exposure aperture 10 is out of the range thereof, so that the shutter 16 effects the exposure which accordingly varies with variation of the speed of rotation of this shutter.

Having thus described my invention, I do not wish to be limited to the precise details described as changes may be readily made without departing from the spirit of my invention, but having thus described my invention, I claim as new and desire to secure by Letters Patent the following:

1. In a photographic camera the combination with a revoluble exposure shutter, of a reciprocable shutter associated therewith, spring means for operating said reciprocable shutter in the exposure direction, a releasable abutment device for actuating said reciprocable shutter in the opposite direction with said revoluble shutter including a rotating pawl pivotally mounted for release, and a relatively stationary element controlling release of said pawl to effect actuation of said reciprocable shutter in timed relation with said revoluble shutter.

2. In a photographic camera the combination with a revoluble exposure shutter, of a reciprocable shutter associated therewith and provided with an intermediate exposure opening, yieldable means for operating said reciprocable shutter in one direction to effect momentary exposure through said exposure opening, means for operating said reciprocable shutter, with said revoluble shutter, in the opposite direction and beyond the exposing range of said reciprocable shutter during the non-exposing periods of said revoluble shutter, and means for effecting actuation of said reciprocable shutter by said yieldable means during the exposure periods of said revoluble shutter.

3. In a photographic camera the combination with a revoluble exposure shutter, of a reciprocable shutter associated therewith and provided with an intermediate exposure opening, spring means for operating said reciprocable shutter in the direction opposite that of the rotation of said revoluble shutter to effect momentary exposure through said exposure opening, a releasable device for operating said reciprocable shutter, with said revoluble shutter, in the direction corresponding with rotation of said revoluble shutter and beyond the exposing range of said reciprocable shutter during the non-exposure periods of said revoluble shutter, and means for releasing said releasable device for effecting actuation of said reciprocable shutter by said spring means during the exposure periods of said revoluble shutter.

4. In a photographic camera the combination with a revoluble exposure shutter, of a second shutter associated therewith and provided with an intermediate exposure opening and pivoted for reciprocating movement substantially on the axis of said revoluble shutter, spring means for operating said pivoted shutter in the direction opposite that of the rotation of said revoluble shutter to effect momentary exposure through said exposure opening, a releasable abutment device for operating said pivoted shutter with said revoluble shutter beyond the exposure range of said pivoted shutter during the non-exposure periods of said revoluble shutter including a pawl mounted for rotation with said revoluble shutter and pivoted for release of said pivoted shutter, and a relatively stationary element controlling release of said pawl for effecting actuation of said pivoted shutter by said spring means during the exposure periods of said revoluble shutter.

EDWIN G. MAYER.